(12) United States Patent
Ogawa (10) Patent No.: US 6,542,284 B2
(45) Date of Patent: Apr. 1, 2003

(54) DISPLAY DEVICE AND MANUFACTURING METHOD THEREFOR

(75) Inventor: Akiko Ogawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/962,222

(22) Filed: Sep. 26, 2001

(65) Prior Publication Data

US 2002/0041423 A1 Apr. 11, 2002

(30) Foreign Application Priority Data

Oct. 11, 2000 (JP) .......................................... 2000-310809
Sep. 25, 2001 (JP) .......................................... 2001-292198

(51) Int. Cl.$^7$ .......................... G02B 26/00; G09G 03/34
(52) U.S. Cl. ........................................ 359/296; 345/107
(58) Field of Search ............................... 359/296, 620; 355/400, 401; 430/290, 32, 35; 345/107; 264/4.1; 428/321.5

(56) References Cited

U.S. PATENT DOCUMENTS

| | | | |
|---|---|---|---|
| 2,551,783 A | 5/1951 | Ash | 301/63 |
| 3,612,758 A | 10/1971 | Evans et al. | 178/5.4 R |
| 3,670,323 A * | 6/1972 | Sobel et al. | 345/107 |
| 4,695,528 A | 9/1987 | Dabisch et al. | 430/290 |
| 4,919,521 A * | 4/1990 | Tada et al. | 359/296 |
| 6,025,896 A | 2/2000 | Hattori et al. | 349/86 |
| 6,330,054 B1 * | 12/2001 | Ikami | 345/107 |
| 6,400,492 B1 * | 6/2002 | Morita et al. | 204/477 |

FOREIGN PATENT DOCUMENTS

| | | | | |
|---|---|---|---|---|
| JP | 49-5598 | 2/1974 | | |
| JP | 55-154198 | 12/1980 | | |
| JP | 57-82086 | 5/1982 | | |
| JP | 9-185087 | 7/1997 | | |
| JP | 10-149118 | 6/1998 | | |
| JP | 11-119264 | 4/1999 | | |
| JP | 11-202804 | 7/1999 | | |
| JP | 2000-35769 | 2/2000 | | |
| JP | 2000322007 A | * 11/2000 | | G09F/9/37 |

* cited by examiner

*Primary Examiner*—Ricky Mack
(74) *Attorney, Agent, or Firm*—Fitzpatrick, Cella, Harper & Scinto (57) ABSTRACT

A display device for use in a microcapsule type electrophoretic display apparatus and a manufacturing method therefor is provided, in which microcapsules can be aligned so as to form a monolayer, and accordingly, the microcapsules can be efficiently used. In addition, a display device is provided in which a color display can be created, positioning of the microcapsules can be easily performed, and accordingly, the contrast is improved, and a manufacturing method therefor is also provided. The display device includes a substrate, an insulating liquid, charged color particles dispersed therein, a first electrode formed on the substrate, and a second electrode, wherein a display is created by causing the migration of the charged color particles toward the first electrode or the second electrode by a voltage applied therebetween. The microcapsules are each formed by enclosing the insulating liquid and the charged color particles in a transparent container, and the microcapsules are aligned and are enclosed in fibers composed of a light transmissive resin.

9 Claims, 5 Drawing Sheets

DISPLAY DEVICE AND MANUFACTURING METHOD THEREFOR

BACKGROUND OF THE INVENTION

1. Field of the Invention

The present invention relates to a display device and manufacturing methods therefor, and more particularly, relates to an electrophoretic display device wherein a display is created by causing the migration of charged color particles in a liquid by a voltage applied to electrodes, and a manufacturing method therefor.

2. Description of the Related Art

Recently, concomitant with the progress of information devices, data volume of various information has been increasing rapidly, and in addition, output of information has been performed in various forms. In general, the output of information can be roughly classified into a screen display using a display device, such as a cathode ray tube or a liquid crystal panel, and a hard-copy display printed on paper by a printer or the like. In the screen display, the need for a thinner display device having a low power consumption has been growing, and above all, a liquid crystal display device has been actively developed and commercialized as a display device which can fulfill the need describe above. However, for the current liquid crystal display devices, problems have been encountered in that letter images displayed on the screen are difficult to view depending on a viewing angle or reflection and, in addition, eyestrain caused by a flickering light source, low luminance, and the like has not been satisfactorily solved. In addition, a screen display using a cathode ray tube has a similar or superior contrast and luminescence compared to a liquid crystal display; however, since a flicker may be generated in a screen display device, the display quality cannot be similarly compared to the hard-copy display described later. In addition, the device using a cathode ray tube is large and heavy, and hence, the portability thereof is significantly inferior.

It has been believed that the hard-copy displays would have disappeared due to computerized information processing; however, a significant amount of hard-copy output has been used in practice. The reason for this is that when information is displayed on a screen, in addition to the problems relating to the display quality described above, the resolution is generally up to 120 dpi (dots per inch) and is considerably inferior to a printout on paper (generally, 300 dpi or more). Accordingly, eyestrain is larger for the screen display compared to the hard-copy display. As a result, even when information can be viewed by the screen display, a hard-copy output is frequently performed. In addition, another important reason the hard-copy display is used even though the screen display can be used is that once hard-copy information is output, a great deal of information can be laid out without being restricted by the size of a screen as in the case of the screen display, and the information thus laid out can be rearranged and can be read one by one without performing a complicated device operation. Furthermore, the hard-copy display has a superior portability since no energy is required for retaining the display, and as long as the volume of information is not significantly large, the information can be read at any time and at any place.

As described above, as long as a movie display or a frequent rewrite is not required, the hard-copy display has various features different from the screen display; however, there is a shortcoming in that a large amount of paper is consumed for a hard copy display. Accordingly, in recent years, development of rewritable recording media (recording media in which a number of cycles of recording and erasing a high visibility image can be performed, and no energy is required for retaining the image thereon) has been actively advancing. A rewritable third display method which successively possesses the features of the hard-copy display described above is referred to as a paper-like display.

Requirements for the paper-like display are rewritable, no energy consumption for retaining an image or a significantly small energy consumption therefor (memory retaining characteristic), superior portability, superior display quality, and the like. As a display method which is currently regarded as the paper-like display, for example, there may be mentioned reversible display media using a matrix system formed of a low molecular resin or a high molecular resin (disclosed in, for example, Japanese Unexamined Patent Application Publication Nos. 55-154198 and 57-82086), which performs recording/erasing by using a thermal printer head. The system described above is used for display portions of some prepaid cards; however, there are problems in that the contrast is not so high, the number of repeatable cycles of recording/erasing is relatively small, such as 150 to 500 times, and the like.

Figure 7A:
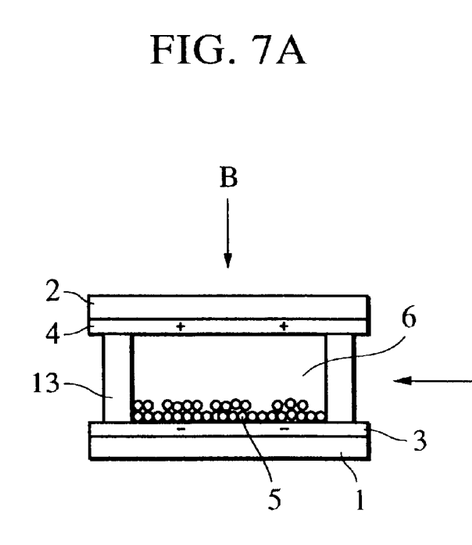
FIG. 7A is a schematic cross-sectional view showing a conventional display device.
Figure 7B:
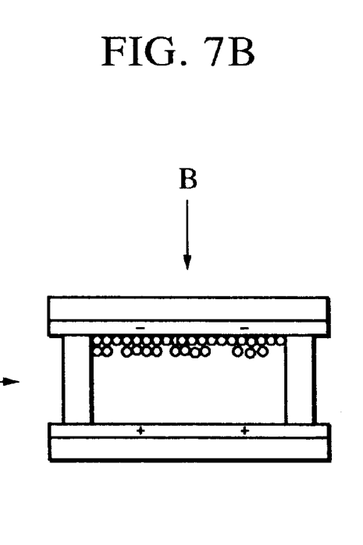
FIG. 7B is a schematic cross-sectional view showing the conventional display device.

As another display method which can be used as the paper-like display, an electrophoretic display device (U.S. Pat. No. 3,612,758) invented by Harold D. Lees, et al. has been known. In addition to the patent mentioned above, Japanese Unexamined Patent Application Publication No. 9-185087 also discloses an electrophoretic display device. FIGS. 7A and 7B are views showing the structure and the operation principle of these electrophoretic display devices mentioned above. This display device includes a pair of substrates 1 and 2 disposed with a predetermined spacing therebetween, and electrodes 3 and 4 formed on the substrates 1 and 2, respectively. The display surface is a side indicated by the arrow B, and the electrode 4 provided at the display surface side is transparent. In addition, between the two substrates 1 and 2, there are provided a number of charged color particles 5 which are positively charged and are also colored in this case; an insulating liquid 6 which is colored by a dye dissolved therein so as to have a different color from that of the charged color particles; and partitions 13 which divide the spacing described above into a number of sections in the direction along the surface of the substrate so as to prevent the charged color particles from being localized and to define the spacing between the substrates.

In the display device described above, as shown in FIG. 7A, when a negative voltage is applied to the electrode 3 shown at the lower side in the figure, and in addition, a positive voltage is applied to the electrode 4 at the upper side in the figure, the charged color particles 5 which are positively charged are gathered so as to cover the electrode 3 at the lower side, and when this display device is viewed along the B direction in the figure, a display having the same color as that of the insulating liquid 6 is created.

In contrast, as shown in FIG. 7B, when a positive voltage is applied to the electrode 3 shown at the lower side in the figure, and in addition, a negative voltage is applied to the electrode 4 at the upper side in the figure, the charged color particles 5 which are positively charged are gathered so as to cover the electrode 4 at the upper side, and when this display device is viewed along the B direction in the figure, a display having the same color as that of the charged color particles 5 is created. When this operation described above is performed in each pixel unit, an optional image can be displayed by a number of pixels.

The display device shown in FIGS. 7A and 7B creates a display by causing the migration of the charged color particles in the direction perpendicular to the surface of the substrate in accordance with a voltage applied between the electrodes provided on the pair of substrates opposing each other. In addition to this display device, a display device disclosed in Japanese Unexamined Patent Application Publication Nos. 49-5598 and 11-202804 has been proposed in which a pair of electrodes, i.e., a first display electrode and a second display electrode, is disposed on the same substrate, and charged color particles are moved in the direction parallel to the substrate when viewed from an observer side. This display device described above creates a display by causing the migration of the charged color particles in a transparent insulating liquid in parallel to the surface of the substrate and between the first display electrode and the second display electrode in accordance with a voltage applied therebetween.

In this horizontal migration type electrophoretic display device, a transparent insulating liquid is used in many cases, and when viewed from the observer side, the first display electrode and the second display electrode show different colors from each other, and one of the color of the display electrodes is the same as that of the migrating particles. For example, in the case in which the first display electrode is black, the second display electrode is white, and the migrating particle is black, when the migrating particles are gathered at the first display electrode side, the second display electrode is exposed so that a white color is viewed, and when the migrating particles are gathered at the second display electrode side, a black color which is the color of the migrating particle is viewed.

Figure 6:
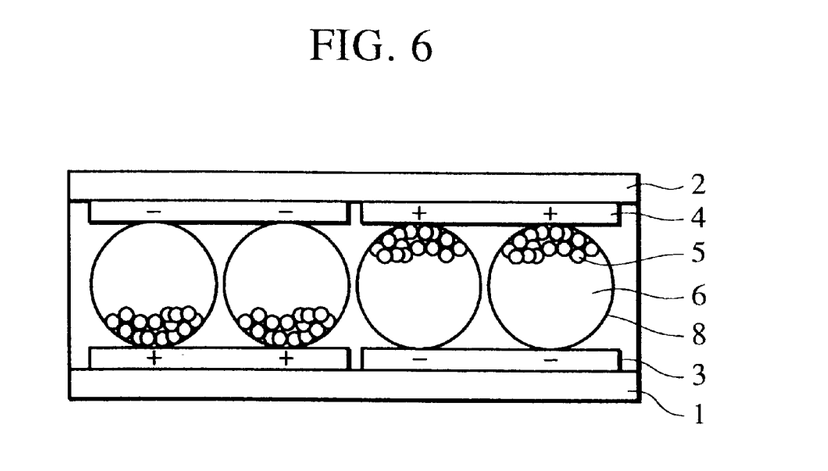
FIG. 6 is a schematic cross-sectional view showing a conventional display device.

In addition, recently, an electrophoretic display device using microcapsules has been proposed (U.S. Pat. No. 2,551,783). In FIG. 6, a cross-sectional view of the electrophoretic display device using the microcapsules is shown. Charged color particles 5 which are colored and an insulating liquid 6 which is colored so as to have a different color from that of the charged color particle are enclosed in transparent containers 8 having a diameter of approximately 50 μm, and these containers 8 are applied to a substrate 1, thereby forming a display device. In order to create an image display, electrodes 3 and 4 are provided at the top and the bottom of this microcapsules 8, and as in the case of the conventional electrophoretic display method, a voltage is applied between the electrodes 3 and 4, whereby the color of the charged color particles 5 or the color of the insulating liquid 6 can be displayed.

As for the features of the microcapsule type electrophoretic display device, since the charged color particles and the insulating liquid (that is, a dispersing liquid for migration) can be disposed by merely applying the microcapsules to the substrate, compared to the conventional electrophoretic display device, injection steps for the charged color particles and the insulating liquid are not required, and hence, formation of the display device can be easily performed. In addition, since partitions are not particularly required, for example, displacement or damage of partitions caused by warping of the substrate does not occur, and the flexibility of the display device can be increased.

However, in the conventional microcapsule type electrophoretic display device, since the microcapsules are mixed with a binder and are then applied to the substrate together with the binder, some microcapsules overlap each other or are disposed at a place at which the electrodes are not provided, whereby there are some microcapsules which do not serve to create a display.

In addition, in order to create a color display, microcapsules having different colors must be regularly disposed, and in the case described above, a printing plate for printing a predetermined shape with the microcapsules mixed with a binder is required, whereby there is a problem in that the manufacturing cost is increased.

As a method of disposing microcapsules in an area at which electrodes are provided, in addition to the printing method described above, as disclosed in Japanese Unexamined Patent Application Publication No. 2000-35769, a method has been proposed in which by using an ink-jet type ejection head provided with a nozzle having a diameter through which one microcapsule is allowed to pass, the microcapsules are sequentially ejected on desired positions on a substrate. However, in the method described above, in addition to the difficulty of ejecting the microcapsules one by one, there is another problem in that it is difficult to accurately fix the microcapsules at the predetermined positions so as to be adjacent to each other. The reason for this is that when the microcapsule thus ejected reaches the substrate, the microcapsule is brought into contact with a microcapsule adjacent thereto which is previously disposed, so that the predetermined position for each microcapsule was displaced.

As described above, since it has been difficult to regularly and accurately dispose the microcapsules so as to form a monolayer, the microcapsules which are prepared cannot be efficiently used, and in addition, the difficulty described above has been one of major obstacles to the formation of a color display device.

In addition, since the microcapsules has a spherical shape, when a monolayer thereof is formed, gaps are formed between the microcapsules adjacent to each other, and as a result, an effective display area is decreased corresponding to the gaps thus formed, whereby the contrast of the display is decreased. As a method for avoiding the problem described above, it may be considered that microcapsules in a flat shape are formed by compression so as not to form the gaps between the capsules. When the microcapsules can be formed in a flat shape, the driving voltage can also be decreased.

However, since a microcapsule located at the edge portion of the electrode has no microcapsule adjacent thereto, when the microcapsules are compressed, a part of the microcapsule located at the edge portion of the electrode is extended outside from the electrode and is adversely influenced by an adjacent electrode, and as a result, the contrast may also be decreased in some cases. In order to form flat microcapsules without extending outside from the electrode, the microcapsules must be accurately disposed at a central portion of the electrode beforehand; however, in the case described above, a highly accurate alignment technique is required. In particular, as is the case in which a horizontal migration type display is performed using the microcapsules, the phenomenon described above may become a major problem when microcapsules having a size approximately equivalent to that of a pixel are used.

SUMMARY OF THE INVENTION

The present invention was made to solve the problems described above, and an object of the present invention is to provide a display device for use in a microcapsule type electrophoretic display apparatus and a manufacturing method therefor, in which microcapsules can be aligned to form a monolayer structure, and accordingly, the microcapsules can be efficiently used. In addition, another object of the present invention is to provide a display device and a manufacturing method therefor, in which a color display can be created, positioning of the microcapsules can be easily performed, and as a result, the contrast is improved.

That is, a display device in accordance with one aspect of the present invention comprises a substrate, an insulating liquid, charged color particles dispersed in the insulating liquid, a first electrode formed on the substrate, and a second substrate, in which the charged color particles migrate toward the first electrode or the second electrode by applying a voltage therebetween so that a display is created. In the display device of the present invention described above, the insulating liquid and the charged color particles are enclosed in light transmissive walls so as to form microcapsules, and the microcapsules are aligned and are enclosed in fibers composed of the light transmissive resin.

One line of aligned microcapsules is preferably enclosed in the light transmissive resin fiber.

In addition, the length of the microcapsule in the direction parallel to the substrate is preferably larger than the length of the microcapsule in the direction perpendicular to the substrate.

The fibers enclosing the microcapsules are preferably aligned on the substrate.

In accordance with another aspect of the present invention, a method for manufacturing an electrophoretic display device including a substrate; an insulating liquid; charged color particles dispersed in the insulating liquid; and a first electrode and a second electrode for applying a voltage on the charged color particles provided on the substrate; in which the charged color particles migrate toward the first electrode or the second electrode by a voltage applied therebetween so that a display is created. The method comprises a preparing step of preparing microcapsules containing the insulating liquid and the charged color particles therein, a forming step of forming fibers each comprising a light transmissive resin and the microcapsules which are aligned and enclosed in the light transmissive resin; and a disposing step of disposing the fibers on the substrate provided with at least one of the first electrode and the second electrode.

The forming step described above is preferably performed by extruding the microcapsules with the light transmissive resin from a nozzle so that the microcapsules are aligned and enclosed in the light transmissive resin.

The manufacturing method described above preferably further comprises a step of compressing the microcapsules into a flat shape, and a step of curing the light transmissive resin for forming the fibers which enclose the microcapsules in the flat shape.

In accordance with another aspect of the present invention, microcapsules for use in electrophoretic display comprise charged color particles, an insulating liquid in which the charged color particles are dispersed, and light transmissive walls each enclosing the charged color particles and the insulating liquid, wherein microcapsules in an aligned state are enclosed in a light transmissive resin, and the light transmissive resin is in the form of a fiber.

Further objects, features and advantages of the present invention will become apparent from the following description of the preferred embodiments with reference to the attached drawings.

DESCRIPTION OF THE PREFERRED EMBODIMENTS

Hereinafter, embodiments of display devices according to the present invention will be described in detail with reference to FIGS. 1 to 3.

Figure 1:
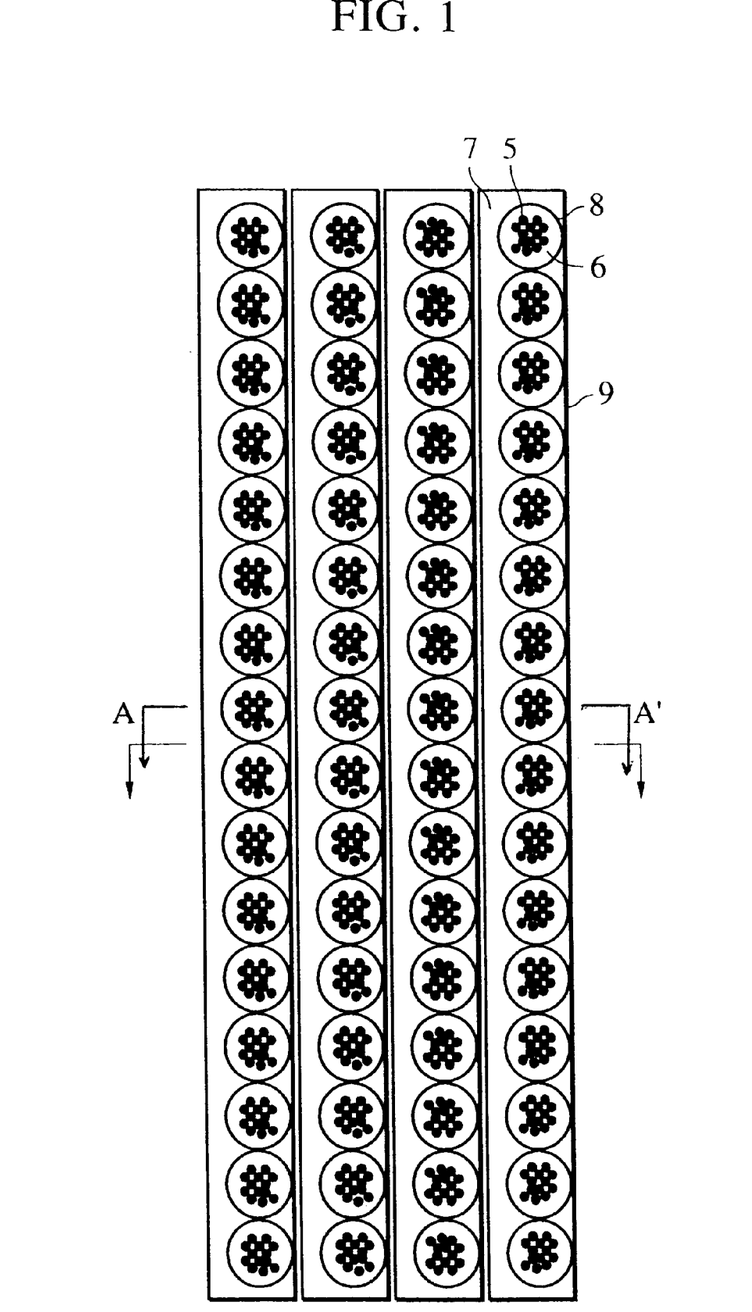
FIG. 1 is a plan view showing an example of an electrophoretic display device which is a display device according to the present invention.

FIG. 1 is a plan view showing an example of an electrophoretic display device which is a display device of an embodiment according to the present invention. FIG. 2 is a cross-sectional view taken along the line AA' in FIG. 1. FIG. 3 is a cross-sectional view showing another example of an electrophoretic display device taken along the line AA' in FIG. 1.

Figure 2:
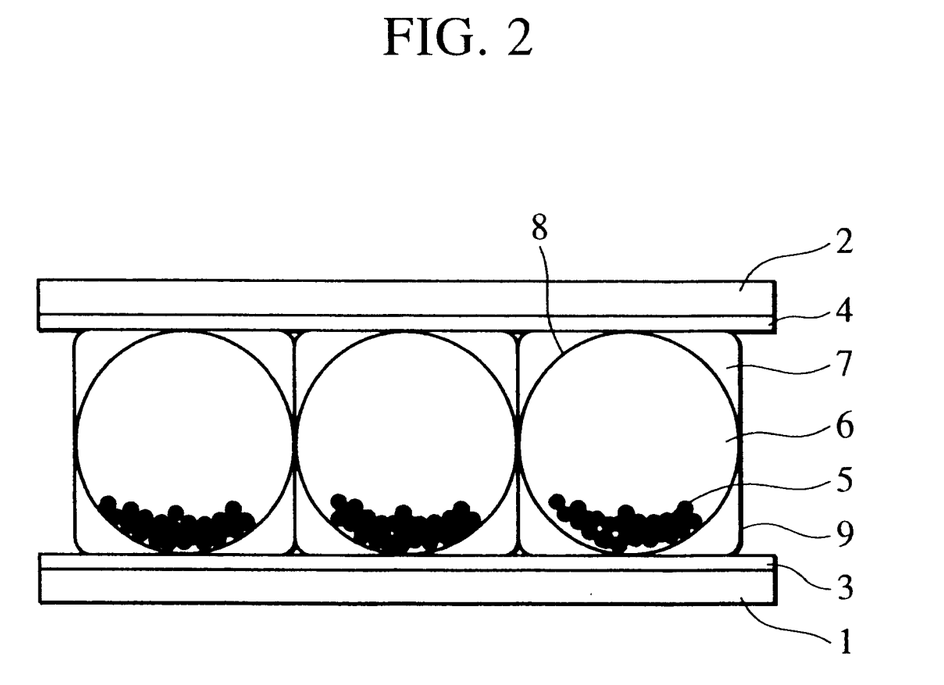
FIG. 2 is a cross-sectional view taken along the line AA' in FIG. 1.
Figure 3:
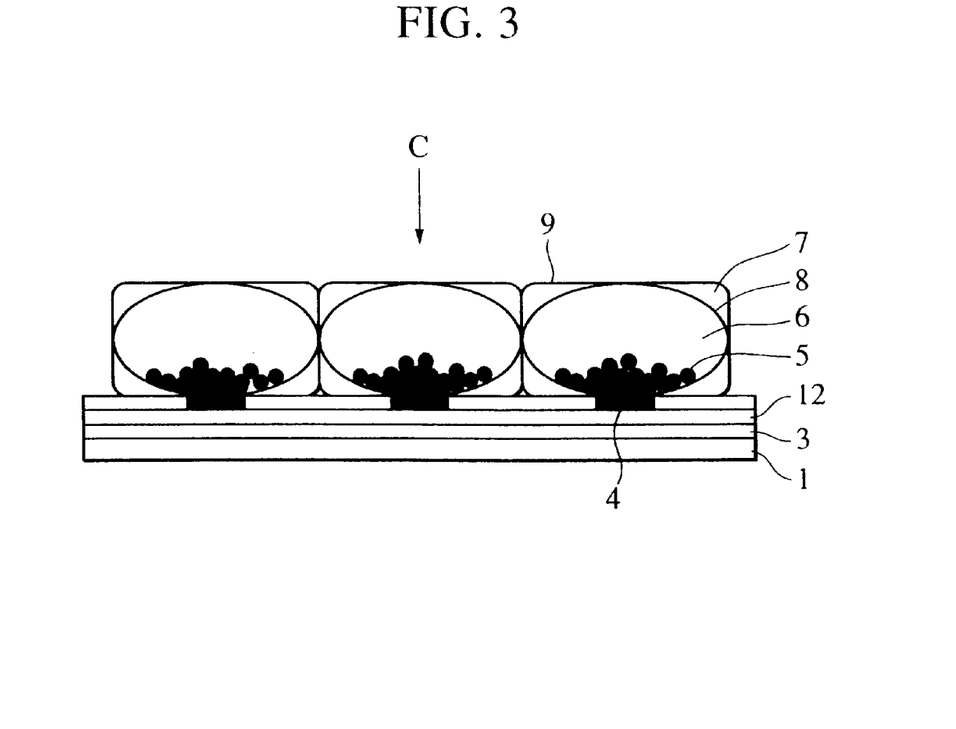
FIG. 3 is a cross-sectional view showing another example of an electrophoretic display device taken along the line AA' in FIG. 1.

In FIGS. 1 to 3, reference numeral 6 indicates an insulating liquid; reference numeral 5 indicates charged color particles; reference numeral 8 indicates a light transmissive microcapsule which is formed of an insulating material and encloses the insulating liquid 6 and the charged color particles 5; reference numeral 7 indicates a binder composed of a light transmissive resin; and reference numerals 1 and 2 indicate a first substrate and a second substrate, respectively. One line of aligned microcapsules 8 is fixed by the binder 7 so as to form a fiber 9, and the microcapsules are bonded to an electrode 3 or 4. In FIG. 1, the first substrate 1, the second substrate 2, the first electrode 3, and the second electrode 4 are omitted. In FIG. 3, the second substrate 2 is also omitted, and it is not always necessary in practice.

As shown in FIGS. 1 to 3, in the display device according to the present invention, a dispersion composed of the insulating liquid and the charged color particles dispersed therein is enclosed in each capsule, and in addition, one line of aligned capsules is enclosed in a light transmissive resin fiber. According to a method described below, the microcapsules enclosed in the resin fiber are aligned so as to be in contact with each other or to have a predetermined gap therebetween. When the resin fiber is disposed along the electrode, a regular alignment of the microcapsules can be obtained. Since the fibers are aligned one by one, compared to the case in which the microcapsules are aligned one by one, the operation is simple and can be performed in a short period of time, and hence, superior positioning accuracy can be obtained.

Figure 5:
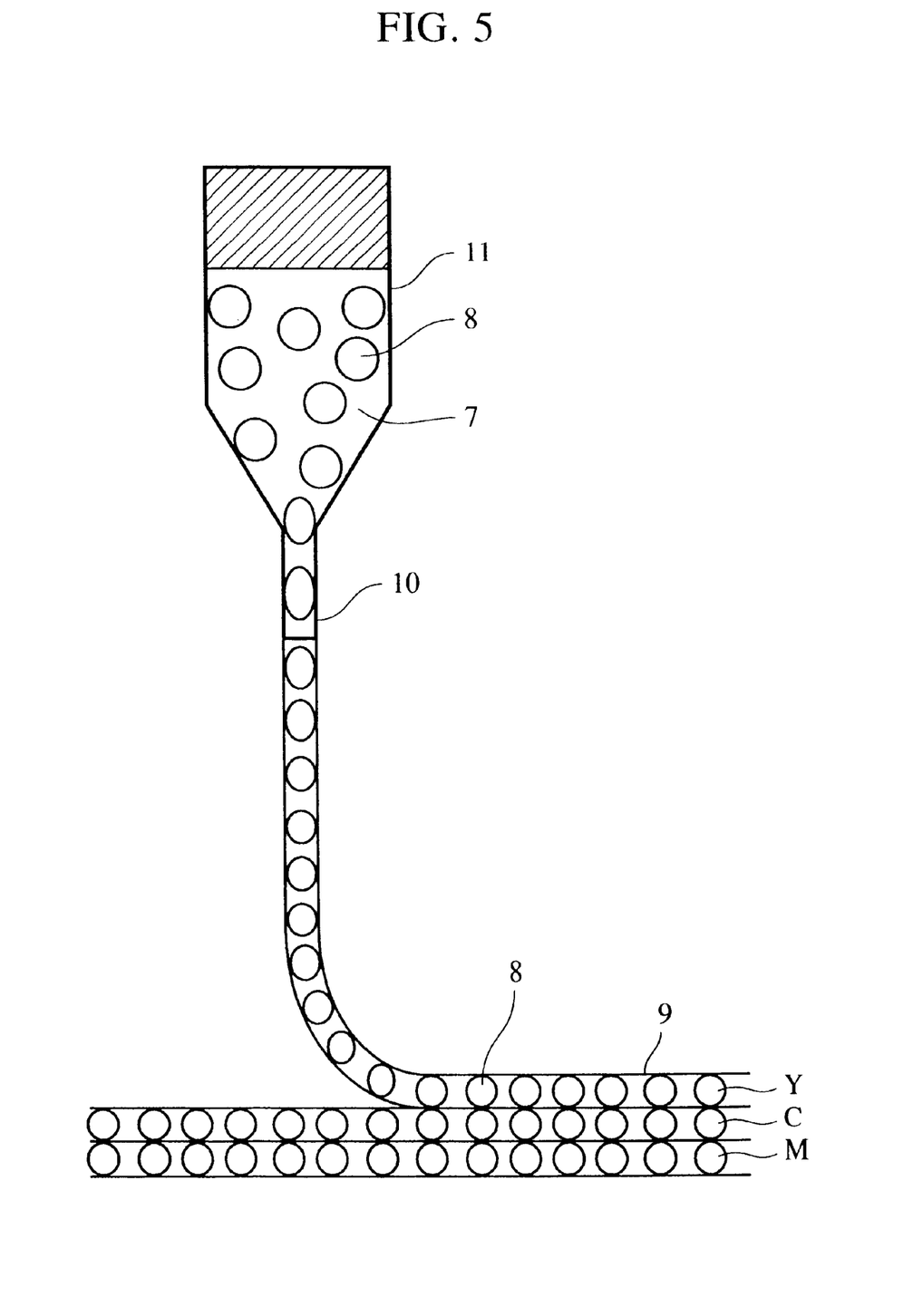
FIG. 5 is a schematic view showing an apparatus for forming a fiber enclosing microcapsules according to the present invention.

In the manufacturing method described below, as shown in FIG. 5, since microcapsules compounded with a binder resin are extruded from a nozzle into a fiber shape, the diameter of the fiber is determined to be approximately equivalent to that of the nozzle. When the diameter of the nozzle is formed so as to allow one microcapsule to pass therethrough, a fiber enclosing one line of aligned microcapsules can be formed. In the step described above, the diameter of the fiber is approximately equivalent to that of the microcapsule. Since the fiber is formed so as to align the microcapsules, the fiber needs not have an unnecessarily wider diameter and preferably has a diameter approximately equal to that of the microcapsule. In addition, when a cross-sectional shape of the nozzle is formed to be a rectangle, a fiber enclosing a plurality of lines of the microcapsules can be formed.

The gaps between the microcapsules enclosed in the fiber are set to a desired value by controlling the concentration of the binder compounded with the microcapsules, the extrusion speed thereof from the nozzle, and the like. When the microcapsules enclosed in the fiber is applied to a matrix display device described later, the gap may be determined in accordance with an interval between pixels. In general, it is not preferably that the gap between the microcapsules is unnecessarily large, since areas which do not serve as display areas are increased, and the contrast is thereby decreased. In the present invention, by adjusting the concentration of the binder compounded with the microcapsules, the density of the microcapsules in the nozzle, the extrusion rate, and the curing rate of the resin, the microcapsules can be aligned with a desired gap therebetween, and particularly, the microcapsules can also be aligned so as to be in contact with each other.

In addition, the resin fiber has adequate rigidity or flexibility to be aligned on the substrate, and the degree thereof differs depending on methods for alignment on the substrate. When a cured resin fiber is cut into an appropriate length and is then disposed on a strip-shaped electrode, the resin fiber is formed as rigid as possible, and when a resin fiber in a semi-cured state is disposed on the substrate while extruded from the nozzle, the resin fiber is formed so as to have flexibility. By appropriately selecting a resin material, these properties described above can be controlled.

Figure 4:
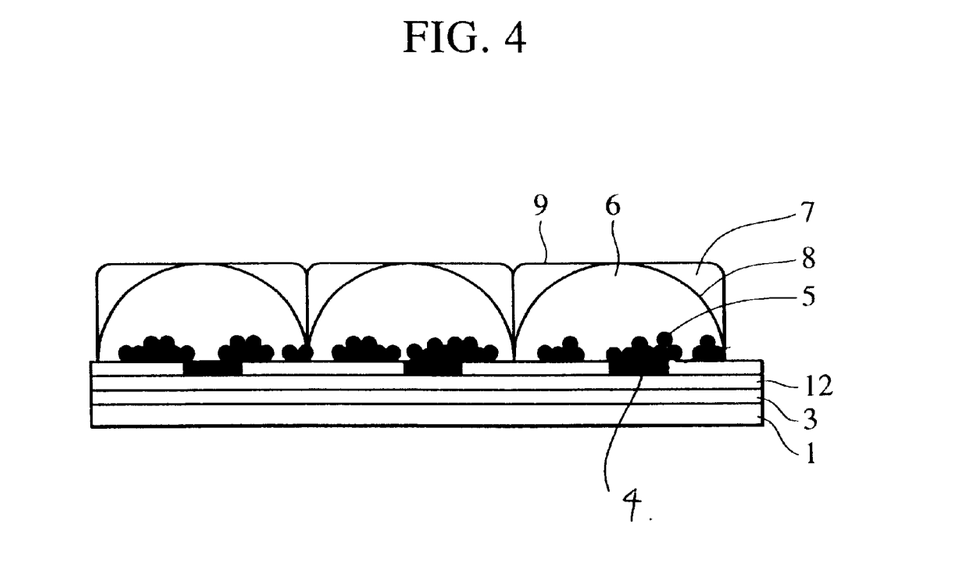
FIG. 4 is a cross-sectional view showing another example of a display device according to the present invention.

When the microcapsule has a spherical shape, as described above, the gaps therebetween are formed which do not serve as a display area, resulting in a decrease in contrast. In order to realize both a decrease in gap between the microcapsules and a decrease in driving voltage, it is desired that the thickness of the display device is reduced by deforming the microcapsule by compression or by its own weight. That is, the microcapsule preferably has a shape in which the length in the direction parallel to the substrate is longer than the height in the direction perpendicular thereto, and for example, a flat or an oval shape as shown in FIG. 3, or a semispherical shape as shown in FIG. 4 may be mentioned.

In the present invention, a display is created by causing the migration of the charged color particles between the first electrode 3 and the second electrode 4; however, as described above, as the migration direction of the charged color particles, there are two directions, that is, the direction (a vertical migration type) perpendicular to the substrate and the direction (a horizontal migration type) parallel thereto. Hereinafter, concerning these two type of display devices, embodiments according to the present invention will be described.

In the vertical migration type, as shown in FIG. 2, in the case in which the first electrode 3 and the second electrode 4 are disposed to oppose each other, and observation is performed from the second electrode 4 side, when the charged color particles in the insulating liquid are gathered on the first electrode 3 by applying a voltage between the first electrode 3 and the second electrode 4, the color of the insulating liquid is viewed by the observer. In contrast, when the charged color particles are gathered on the second electrode 4, the color of the charged color particles is viewed by the observer. In the structure described above, for example, when the color of the charged color particles is black, and the color of the insulating liquid is white, a binary display by black and white can be created.

In addition, in the vertical migration type, there is a case in which two types of color particles having different polarities and different colors from each other are dispersed in a transparent insulating liquid so as to create a binary display. As shown in FIG. 2, in the case in which the first electrode 3 and the second electrode 4 are disposed to oppose each other, and observation is performed from the second electrode 4 side, when each type of the charged color particles in the insulating liquid is gathered on the electrode having the polarity opposite to that of the charged color particles by applying a voltage between the first electrode 3 and the second electrode 4, the color of the charged color particles gathered on the second electrode is viewed by the observer. In the structure described above, for example, when positively charged black particles and negatively charged white particles are dispersed in a transparent insulating liquid, a binary display by black and white can be created. In particular, when a voltage is applied so that the second electrode is negative and the first electrode is positive, the black particles are gathered on the second electrode, and the white particles are gathered on the first electrode, whereby the black color is observed by the observer. In a manner similar to that described above, when the polarities of the electrodes are reversed, the white particles are gathered on the second electrode, whereby the white color is observed by the observer.

In addition, for example, when positively charged particle colored magenta and negatively charged white particles are dispersed in a transparent liquid, the color of the particles gathered on the electrode located at the observer side, that is, the magenta or the white, is observed, whereby a binary display by magenta and white can be created.

In the horizontal migration type, in the case in which the first electrode 3 and the second electrode 4 are disposed on the same substrate as shown in FIG. 3, and observation is performed along the direction C shown in the figure, when charged black particles in a transparent insulating liquid are gathered on the first electrode 3 by applying a voltage between the first electrode 3 and the second electrode 4, as disclosed in Japanese Unexamined Patent Application Publication No. 11-202804, a black color is viewed by the observer. In contrast, the charged black particles are gathered on the second electrode 4, a white color is viewed by the observer. In the structure described above, as in the case described above, a binary display by black and white can be created.

When an element performing one of the displays described above is used as one pixel, and these pixels are aligned in matrix, a display device can be obtained. The fibers enclosing the microcapsules are disposed parallel to the row direction or to the column direction in the matrix, and as shown in FIGS. 2 and 3, each fiber is in contact with the first electrode 3 and the second electrode 4 at each pixel portion. When the diameter of the fiber is smaller than the width of the pixel, a plurality of fibers enclosing the microcapsules is disposed in the width of the pixel. In the case of the horizontal migration type display device shown in FIG. 3, since it is preferable that the diameter of the microcapsule be approximately equal to the width of the pixel, as shown in FIG. 3, one fiber is disposed in the width of the pixel in this case.

In many color display devices, one pixel is composed of three sub-pixels having three different colors, and each sub-pixel has a strip shape continuously extending in the column direction. The microcapsule type display device according to the present invention can be easily applied to a color display. That is, when fibers enclosing colored microcapsules are regularly disposed as shown in FIG. 5, a color display can be created. For example, a color display can be created when the microcapsules in the individual fibers are colored yellow (Y), cyan (C), and magenta (M), respectively.

As a color display, a method in which three colors are disposed in parallel and displayed so as to be visually blended, and a method in which three colors are laminated to each other so as to form transmissive light having a blended color thereof may be mentioned. The color display device of the present invention can be applied to both methods described above. In the former method, color fibers having Y, C, M, Y, C, M, and so on are regularly disposed in parallel to each other on the substrate. In the latter method, the fibers having different colors are laminated so as to form a three-layered structure.

A matrix display device formed by aligning the fibers enclosing the microcapsules described above has the following features.

First, since a monolayer alignment of the microcapsule is formed, unnecessary microcapsules overlapping with each other are not present, and hence, the microcapsules can be efficiently used.

Secondary, compared to a conventional method such as an ink-jet method, since the gap between the microcapsules can be reduced, a highly dense alignment can be realized, and hence, the contrast can be increased.

Thirdly, since one line of the aligned microcapsules is enclosed in the fiber, when the microcapsules are compressed into a flat shape, uniform deformation thereof can be obtained, and they do not extend outside from the width of the electrode. Accordingly, no adverse influence from adjacent pixels is present, and hence, a high contrast can be obtained.

Next, a method for manufacturing the display device of the present invention will be described.

An example of a method for manufacturing a display device of an embodiment according to the present invention will be described with reference to FIGS. 2 and 5. First, in microcapsules composed of an insulating material having light transmittance, an insulating liquid and charged color particles dispersed therein are enclosed. The microcapsules can be formed by a known technique. An interfacial polymerization method disclosed in, for example, Japanese Unexamined Patent Application Publication Nos. 10-149118 or 11-119264 is preferably used.

In addition, in this embodiment, an example will be described in which gelatin is used as a material for forming a capsule wall; however, the material for forming the capsule wall is not limited thereto. For example, various compounds, various polymers, and various copolymers, such as polyvinyl acetate, ethyl cellulose, nitro cellulose, polystyrene, polyethylene, polypropylene, epoxy resins, acrylic resins, methacrylic resins, nylons, polyesters, polycarbonates, polyvinyl chloride, polyvinyl alcohol, and sodium alginate, can be used.

As the insulating liquid enclosed in the microcapsule, there may be mentioned an aromatic hydrocarbon, such as toluene or xylene; an aliphatic hydrocarbon, such as a normal paraffin or an isoparaffin; or a halogenated hydrocarbon. Among these mentioned above, an isoparaffin or a silicone oil is preferably used. In addition, a liquid having a low viscosity is preferable. As for the insulating liquid, in order to have a specific gravity equivalent to that of the charged color particle, a plurality of insulating liquids having different specific gravities from each other may be mixed together in some cases. When the insulating liquid is colored, an oil-soluble dye or pigment is used.

As the charged color particle, an organic or an inorganic material may be used which migrates in an insulating liquid by an electric field applied thereto and is in the form of a fine particle. The color of the charged color particle may be a color of the material itself or a color formed by adding a coloring agent. In addition, the charged color particle may be formed of a single material or may be formed of a plurality of materials. In particular, as a white particle, titanium oxide or aluminum oxide is preferably used, and as a black particle or a particle having another color, a resin, such as polyethylene, polystyrene, or an acrylic resin, mixed with a coloring agent is preferably used. As the coloring agent, in addition to carbon, various known dyes or pigments, such as phthalocyanine blue, lake red, and hanza yellow, can be used. In addition, a charge-control agent may be used when necessary. As the size of the charged color particle, a particle having a diameter in the range of from 0.1 to 50 $\mu$m is preferably used, and more preferably, in the range of from 0.1 to 10 $\mu$m.

The microcapsules thus formed are compounded with a binder, such as a water-soluble silicone resin or an acrylic resin, and as shown in FIG. 5, are extruded by an extruder 11 provided with a nozzle 10 having an inside diameter (preferably, in the range of from 30 to 500 $\mu$m) approximately equal to the diameter of the capsule, so that a fiber shape is formed. In the step described above, the gaps between the capsules can be controlled by adjusting the viscosity of the binder and the concentration of the microcapsules in the binder material. An ester resin or a urethane resin may also be used as the binder material. The inside diameter of the nozzle is more preferably in the range of from 50 to 300 $\mu$m.

The shape of the fiber is not specifically limited, and for example, a cross-section having a quadrangular, a triangular, a circular, or an oval shape may be used, and in addition, a combination thereof may also be used.

Next, the fibers enclosing the microcapsules thus formed are disposed on the substrate by steps described below.

First, the vertical migration type display device will be described with reference to FIG. 2.

On the first substrate 1, the first electrode 3 is formed. As a material for the substrate, a glass or a plastic film is used. As a substrate at an observer side, a light transmissive material, such as glass or quartz, may be used, and preferably, a resin film formed of polyethylene phthalate (PET), polyether sulfone (PES), or the like is used.

A material for forming the first electrode 3 is not specifically limited; however, in general, a metal electrode such as aluminum (Al) is used. On the first substrate 1, the fibers enclosing the microcapsules described above are disposed along the first electrode 3 so as to form a monolayer. In the step described above, fibers immediately after being extruded from the nozzle, which are in a semi-cured state, may be disposed on the electrode while the nozzle is moved with respect to the substrate, or fibers which are cured and cut beforehand and have a linearity may be disposed on the electrode. When a binder has an adhesive property as an adhesive, an adhesive is not specifically required; however, an adhesive such as a light transmissive resin may be secondarily used.

As the second electrode 4, a transparent electrode composed of, for example, an ITO film or an organic conductive film is used.

Next, the horizontal migration type display device will be described with reference to FIG. 3. On the first substrate 1, the first electrode 3 is formed. A material for forming the substrate is the same as that used in the vertical migration type. As the first electrode 3, a light-reflective metal electrode such as Al is generally used. On the first electrode 3, a light-scattering insulating layer is provided. For example, a layer composed of a transparent insulating resin and particles for scattering light, such as aluminum oxide or titanium oxide, mixed therewith is formed.

Alternatively, without using fine particles, a method for scattering light by using irregularity of the surface of the metal electrode may be employed.

Next, the second electrode 4 is formed on the insulating layer. As a material for forming the second electrode 4, a conductive material is used having a black color, such as titanium carbide, chromium processed by blackening treatment, or aluminum or titanium having a black layer thereon, when viewed from the observer side for the display device.

Next, on the second electrode 4, the fibers enclosing the microcapsules are disposed so as to form a layer. After the fibers are disposed on the second electrode 4, the microcapsules are deformed into a flat shape by applying a pressure thereto, and subsequently, the binder is preferably cured while the microcapsules are in a flat shape. However, when the binder has a low viscosity, and each capsule has a flexible wall, without applying a pressure to the capsules, the capsules may be deformed by their own weight.

Alternatively, fibers which are cured so as to have a flat shape beforehand may be disposed on the substrate one by one.

The display device can be obtained by connecting a voltage apply circuit to the first and the second electrodes 3 and 4. At the upper side of the display device (at the observer side), the substrate may be provided or may not be provided.

The method for manufacturing the microcapsule display device according to the present invention has the features described below.

First, since the rigid fibers are disposed, or the fibers are disposed by moving the nozzle, the capsules can be easily disposed linearly with superior accuracy.

Secondary, since the electrodes or signal lines are patterned on at least one substrate, the fibers may be merely disposed on the substrate in accordance with the electrode positions, and hence, the positioning accuracy of the fibers with respect to the electrode positions is superior.

Thirdly, when the microcapsules are deformed into a flat shape by compression or by its own weight, since the microcapsules are fixed in the resin, they are not displaced, and as a result, the microcapsules do not extend outside from the electrode.

Hereinafter, the present invention will be described in detail with reference to examples.

EXAMPLE 1

A display device shown in FIG. 2 was formed.

An isoparaffin colored by an oleophilic blue dye was used as the insulating liquid, and yellow particles used as charged color particles, which were composed of a yellow-colored polystyrene having a particle diameter of 1 to 2 $\mu$m, were mixed with and dispersed in the insulating liquid described above so as to form a dispersion containing 3 wt % of the yellow particles. Subsequently, microcapsules each having a flexible wall composed of gelatin and enclosing this dispersion were formed by a typical coacervation method.

The microcapsules thus formed had a wall thickness of 2 to 4 $\mu$m, and a diameter of 100 to 120 $\mu$m. These microcapsules were mixed with an aqueous solution containing 30 wt % of polyvinyl alcohol, were received in an extruder provided with a nozzle having an inside diameter of 100 $\mu$m, and were extruded therefrom so as to form fibers enclosing the microcapsules. Subsequently, the fibers thus formed were disposed on the substrate. The substrate was formed of a first substrate 3 composed of a PET film 200 $\mu$m thick and the first electrode 3 composed of aluminum patterned on the first substrate 3. The fibers were disposed on this substrate, were dried, and were bonded thereto by applying heat.

After a binder layer formed of an aqueous solution containing polyvinyl alcohol was dried, a substrate composed of a second substrate 2 formed of a PET film and an ITO film formed thereon as a second electrode 4 was bonded to the surface of the fiber layer by a light transmissive adhesive so that the fibers and the substrate were brought into close contact with each other, and voltage apply means was provided therefor, whereby the display device was formed.

Display was performed by using the display device thus formed. The applying voltage was set to be ±50 V. The charged color particles used in this example were positively charged in the isoparaffin and migrated to an electrode to which a negative voltage is applied. The response rate was 30 millisecond or less, and irregularity on the display was not observed.

EXAMPLE 2

A display device shown in FIG. 3 was formed.

Isoparaffin was used as the insulating liquid, and black particles as charged color particles, which had a particle diameter of 1 to 2 $\mu$m and were composed of polystyrene and carbon, were mixed with and dispersed in the insulating liquid described above so as to form a dispersion containing 3 wt % of the black particles. Subsequently, microcapsules formed in a manner equivalent to that described in Example 1 were mixed with an aqueous solution containing polyvinyl alcohol having 30 wt % of a stilbazolium group, were received in an extruder provided with a nozzle having an inside diameter of 100 $\mu$m, and were then extruded therefrom so as to form fibers enclosing the microcapsules.

An aluminum layer used as a first electrode 3 was formed on a first substrate 1 composed of a PES film. A light-scattering insulating layer was provided on the first electrode 3. Next, as second electrodes 4, a black titanium carbide film was formed on the insulating layer and was then patterned to form strip shapes by a photolithographic method and a dry etching method. The line width was set to 25 $\mu$m, and the distance between lines was set to 100 $\mu$m.

The fibers enclosing the capsules were placed on the second electrodes 4, were dried, and were then bonded thereto. After the fibers were dried, the fiber and the substrate were brought into close contact with each other, and voltage apply means was provided therefor, whereby the display device was formed.

A PET substrate was placed on the upper surface of the fibers enclosing the microcapsules, the capsules in the fibers were deformed into a flat shape by applying a pressure thereto using a roller, and subsequently, the fibers were cured by irradiation of ultraviolet rays. On the upper surfaces of the fibers enclosing the capsules, a light transmissive film was formed as a protective film. Next, voltage apply means was provided therefor, whereby the display device was formed.

Display was performed by using the display device thus formed. The charged color particles were positively charged in the isoparaffin and migrated toward an electrode to which a negative voltage is applied. In the step described above, irregularity on the display was not observed.

EXAMPLE 3

Microcapsules were formed in a manner similar to that of Example 2.

The microcapsules described above each had a wall thickness of 5 $\mu$m and a diameter of approximately 200 $\mu$m. These microcapsules were mixed with an aqueous solution containing 20 wt % of polyvinyl alcohol, were received in an extruder provided with a nozzle having an inside diameter of 200 $\mu$m, and were extruded therefrom, thereby forming fibers enclosing the microcapsules. The fibers thus formed were disposed in parallel on a substrate and were bonded thereto, and subsequently, the fibers were cured. The substrate used in this example was equivalent to that in Example 2. Before the fibers were cured, the capsules were deformed into a semispherical shape by its own weight. On the upper surfaces of the fibers enclosing the capsules, a light transmissive film was formed as a protective film. Next, voltage apply means was provided therefor, whereby a display device was formed.

Display was performed by using the display device thus formed. The charged color particles were positively charged in the isoparaffin and migrated toward an electrode to which a negative voltage is applied. In the step described above, irregularity on the display was not observed.

EXAMPLE 4

A silicone oil was used as the insulating liquid, and three types of color particles used as charged color particles, each having a particle diameter of 1 to 2 $\mu$m and composed of polystyrene and one of a yellow, a cyan, and a magenta coloring dye, were respectively mixed with and dispersed in the insulating liquid described above so as to form dispersions each containing 3 wt % of the color particles described above.

Fibers enclosing microcapsules were formed in a manner similar to that in Example 1, were disposed on the same second electrode 4 as that described above and bonded thereto so that the individual colors are disposed in order, and subsequently, the fibers were cured. On the upper surfaces of the fibers, a light transmissive film was formed as a protective film. Next, voltage apply means was provided therefor, thereby forming a display device.

Display was performed by using the display device thus formed. The charged color particles were positively charged in the silicone oil and migrated toward an electrode to which a negative voltage is applied. In the step described above, irregularity on the display was not observed, and a color display could be created.

EXAMPLE 5

A silicone oil was used as the insulating liquid, and three types of color particles used as charged color particles, each having a particle diameter of 1 to 2 $\mu$m and composed of polystyrene and one of a yellow, a cyan, and a magenta coloring dye, were respectively mixed with and dispersed in the insulating liquid described above so as to form dispersions each containing 3 wt % of the color particles described above.

Fibers enclosing microcapsules were formed in a manner equivalent to that in Example 1, were disposed on the same second electrode 4 as that described above, and were then bonded thereto. A PET substrate was placed on the upper surfaces of the fibers, and a pressure was applied to the PET substrate by using a roller so as to deform the capsules enclosed in the fiber into a flat shape. The fibers were then cured, and subsequently, the PET substrate was removed. On the upper surfaces of the fibers, a light transmissive film was formed as a protective film, and voltage apply means was then provided therefor, whereby a display device was formed.

Display was performed by using the display device thus formed. The charged color particles were positively charged in the silicone oil and migrated toward an electrode to which a negative voltage is applied. In the step described above, irregularity on the display was not observed, and a color display could be created.

EXAMPLE 6

An isoparaffin was used as an insulating liquid, and three types of color particles used as charged color particles, each having a particle diameter of 1 to 2 $\mu$m and composed of polystyrene and one of a yellow, a cyan, and a magenta coloring dye, were respectively mixed with and dispersed in the insulating liquid described above so as to form dispersions each containing 3 wt % of the color particles described above. In a manner equivalent to that in Example 3, fibers enclosing microcapsules were formed, were disposed on a first substrate 1, and were then bonded thereto. Subsequently, the fibers were cured. Before the fibers were cured, the microcapsules were deformed into a semispherical shape by its own weight. On the upper surfaces of the fibers, a light transmissive film was formed as a protective film. Voltage apply means was then provided therefor, whereby a display device was formed.

Display was performed by using the display device thus formed. The charged color particles were positively charged in the isoparaffin and migrated toward an electrode to which a negative voltage is applied. In the step described above, irregularity on the display was not observed, and a color display could be created.

As has thus been described, in the microcapsule type electrophoretic display device according to the present invention, the microcapsules mixed with the binder can be aligned to form a monolayer on the substrate, and hence, the microcapsules prepared can be efficiently used. In addition, a color display can be created by the display device using these microcapsules.

In addition, the shape of the microcapsules can be changed from a sphere to a shape in which the length in the direction parallel to the surface of the substrate is larger than the length in the direction perpendicular thereto. Accordingly, since the gaps, which do not serve as a display area, formed between the microcapsules can be reduced, the contrast can be improved, and in addition, a driving voltage can also be reduced by decreasing the thickness of the display device portion.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display device comprising:
   a substrate;
   an insulating liquid;
   charged color particles dispersed in the insulating liquid;
   a first electrode formed on the substrate;
   a second electrode; and
   a voltage source to apply a voltage between the first electrode and the second electrode to cause the charged color particles to migrate so that a display is created, wherein
      the insulating liquid and the charged color particles are enclosed in transparent containers so as to form microcapsules; and
      the microcapsules are aligned and are enclosed in resin fibers composed of the light transmissive resin.

2. A display device according to claim 1, wherein one line of aligned microcapsules is enclosed in each resin fiber.

3. A display device according to claim 2, wherein the diameter of the resin fiber is approximately equal to the diameter of the microcapsule.

4. A display device according to claim 1, wherein the length of the microcapsule in the direction parallel to the substrate is larger than the length of the microcapsule in the direction perpendicular to the substrate.

5. A display device according to claim 4, wherein the microcapsule has a flat spheroidal shape.

6. A display device according to claim 4, wherein the microcapsule has a semispherical shape.

7. A display device according to claim 1, wherein the resin fibers enclosing the microcapsules therein are aligned on the substrate.

8. A display device according to claim 7, wherein the microcapsules enclosed in resin fiber have one of three colors.

9. A display device according to claim 8, wherein the one of the three colors is yellow, cyan, and magenta.

* * * * *

UNITED STATES PATENT AND TRADEMARK OFFICE
CERTIFICATE OF CORRECTION

PATENT NO. : 6,542,284 B2
DATED : April 1, 2003
INVENTOR(S) : Akiko Ogawa It is certified that error appears in the above-identified patent and that said Letters Patent is hereby corrected as shown below:

<u>Title page,</u>
Item [56], References Cited, FOREIGN PATENT DOCUMENTS, "2000322007 A" should read -- 2000-322007 A --.

Signed and Sealed this

First Day of June, 2004

JON W. DUDAS
*Acting Director of the United States Patent and Trademark Office*